Aug. 23, 1927.
O. A. MÜLLER
PLANT SUPPORT
Filed Dec. 16, 1925
1,639,781
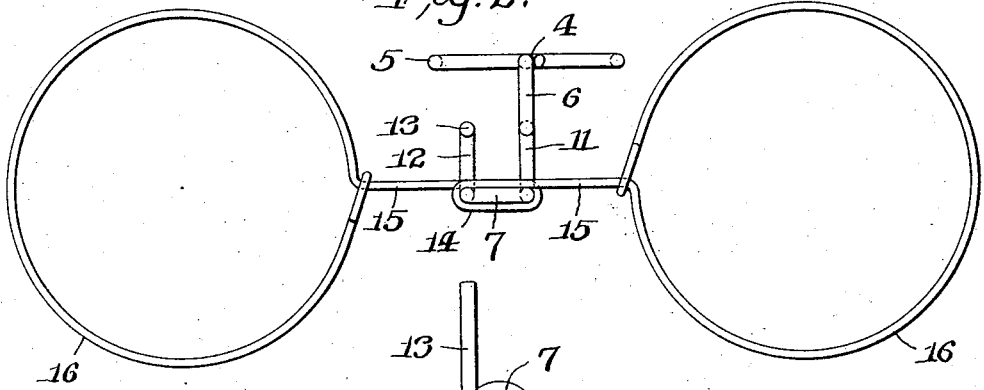
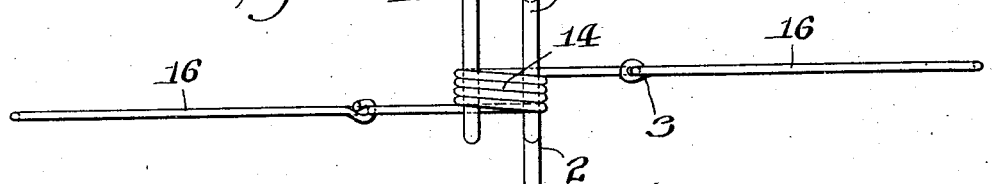
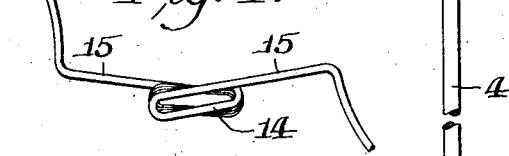
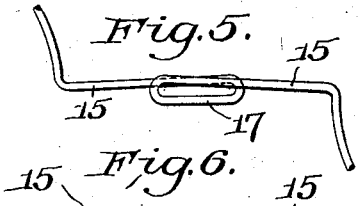
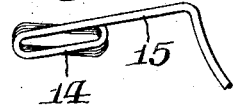
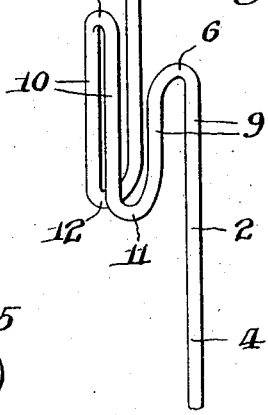
INVENTOR:
Otto A. Müller
BY
ATTORNEY Patented Aug. 23, 1927.

1,639,781

UNITED STATES PATENT OFFICE.

OTTO A. MÜLLER, OF AMBLER, PENNSYLVANIA.

PLANT SUPPORT.

Application filed December 16, 1925. Serial No. 75,714.

This invention relates to improvements in wire plant supports comprising a standard adapted to be inserted into the ground and one or more plant supporting arms constructed to be applied to and removed from the standard.

One object of the invention is to provide a novel standard formed of a single piece of wire bent to provide one or more upwardly extending loops constituting projections to receive and support one or more plant supporting arms.

Another object of the invention is to provide a plant supporting arm or arms with a novel, simple and efficient means for connecting it or them with a projection on the standard so that the arm or arms will be held rigidly and firmly in place without liability of accidental displacement.

With the foregoing and related objects in view, the invention consists in the novel construction, combination and arrangement of parts hereinafter described.

In the accompanying drawings, illustrating the invention,

Figure 1 is a front view of my improved plant support.

Figure 2 is a top view thereof.

Figure 3 is a perspective view of the upper portion of the standard.

Figure 4 is a top view of the central portion of the plant supporting member in the normal condition thereof when removed from the standard.

Figure 5 is a view similar to Fig. 4, showing a modification of the connecting loop of the plant supporting member.

Figure 6 is a front view of the parts shown in Fig. 5.

Figure 7 is a view similar to Fig. 4, showing a modification of the plant supporting member.

Referring to the drawings, 2 designates a standard and 3 a plant supporting member supported thereby.

The standard 2 is formed of a single piece of wire which is bent into the form illustrated and which includes the vertically disposed part 4 forming the main body of the standard, the loop 5 at the bottom of the part 4, and the upwardly extending projections 6 and 7 at upper portion of the part 4.

The loop 5 is formed with downwardly converging side parts 8 to permit it easily to be inserted into the soil to support the standard in vertical position or substantially so. When the loop 5 is inserted into the soil it prevents the standard from turning.

The projection 6 is formed by a loop comprising substantially parallel side members 9 connected at their upper ends; and the projection 7 is similarly formed by a loop comprising substantially parallel side members 10 connected at their upper ends, as shown. The bottom of one side member 9 of the projection 6 is connected to and forms, in effect, a continuation of the body part 4; and the bottom of the other side member 9 of the projection 6 is connected to the bottom of one side member 10 of the projection 7 by a part 11. The bottom of the other side member 10 of the projection 7 is connected by a part 12 to the lower end of a vertically extending arm 13 which is the terminal portion of the upper end of the piece of wire forming the standard.

The plant supporting member 3 shown in Figs. 1, 2 and 4 is formed of a single piece of wire which is bent into the form illustrated and which comprises a connecting loop 14 which surrounds the projection 7, arms 15 extending outwardly from the loop 14 and having relatively large, horizontally arranged loops 16 formed by the outer ends thereof to receive and support parts of growing plants.

The loop 14 is a yieldable coil formed by superposed layers of wire each of which embraces the projection 7, the upper end of the coiled wire forming the loop 14 terminating in one arm 15 and the lower end of the coiled wire forming the loop 14 terminating in the other arm 15.

The loop 14 formed by the coil is elongated with straight side portions to fit snugly around the projection 7 and, in its normal condition, it has a twist therein, as shown in Fig. 4, which throws the side portions of the coil out of parallel relationship. When the loop 14 is applied to the projection 7 the side portions of the coil are forced into parallel relationship or substantially so, so that the parts of the coil forming the loop will be pressed firmly into close contact with the projection, as the coil tends to resume its normal condition. The layers of wire, forming the loop 14, engaging the projection 7 one above the other, give rigidity to the entire structure and serve to prevent the plant supporting loops 16 from being tilted or rocked on the projection 7.

The wire loop forming the projection 6 is set at right angles to the wire loop forming the projection 7, and the connecting loop 14 of the plant supporting member may be applied to either projection 6 or 7, or a plant supporting member may be applied to each projection. The arms 15 of the plant supporting member 3 when applied to the projection 6 will extend at right angles to their position when applied to the projection 7.

When the plant supporting member 3 is applied to either projection 6 or 7 the part 11 connecting them forms a stop projection extending outwardly from each one to limit the downward movement of the connecting loop 14 of the plant supporting member 3.

In the modification shown in Figs. 5 and 6 a connecting loop 17 for the plant supporting member 3 is formed by a single loop of wire, as distinguished from a coil. and the straight terminal portions of the wire forming the loop 17 are located one above the other and out of parallel relationship, as shown in Fig. 5, so that when the loop 17 is applied to the projection 6 or 7, the terminal portions of the loop 17 will be sprung into parallel relationship and exert pressure against the projection to which the loop is applied to hold it in place thereon, as the loop 17 tends to resume its normal condition.

The modification shown in Fig. 7 is the same as the construction shown in Figs. 1, 2 and 4 excepting that one of the arms 15 and its plant supporting loop 16 is omitted.

I claim:—

1. In a plant support, the combination of a standard having two upwardly extending projections each of a width greater than the thickness thereof and one being set substantially at right angles to the other, and a plant supporting member having an elongated loop constructed to surround and engage either projection of the standard and to be thereby supported and prevented from turning.

2. In a plant support, the combination of a standard having a projection, and a plant supporting member mounted on the projection and having an arm extending outwardly therefrom, the arm being formed of a single piece of bent wire and including a loop surrounding the projection, and the standard and its projection being formed of a single piece of bent wire and including a vertically disposed part forming the main body of the standard, parallel side members connected at their upper end and forming the projection, the lower end of one of the side members being connected to said part, and the lower end of the other of the side members being extended laterally and forming a stop to prevent downward movement of the supporting arm on the projection.

3. In a plant support, the combination of a standard having an upwardly extending projection of a width greater than its thickness, and a plant support having an elongated loop applied to the projection and being formed of superposed layers of wire forming a coil surrounding the projection and held in gripping engagement therewith by tending to resume a normal position from which it was sprung by twisting the coils of the loop about the longitudinal axis thereof.

4. A plant supporting member having a loop constructed to be applied to a support and being formed of superposed layers of wire forming a coil elongated laterally of its longitudinal axis and being twisted on its longitudinal axis throwing the side portions of the layers out of alinement with each other.

In testimony whereof I affix my signature.

OTTO A. MÜLLER.